United States Patent [19]

Bräunlich et al.

[11] Patent Number: 6,111,548
[45] Date of Patent: Aug. 29, 2000

[54] ENCLOSED POWER TRANSMISSION SYSTEM WITH A SENSOR POSITIONED WITHIN THE ENCLOSURE AND AN ANTENNA ASSIGNED TO THE SENSOR

[75] Inventors: Christoph Bräunlich, Schönefeld; Armin Diessner, Berlin; Jörg Gorablenkow, Berlin; Thomas Kelch, Berlin; Christian Korden, München; Klaus-P Lange, Putzbrunn, all of Germany

[73] Assignee: Siemens AG, Munich, Germany

[21] Appl. No.: 09/258,179

[22] Filed: Feb. 25, 1999

[30] Foreign Application Priority Data

Feb. 27, 1998 [DE] Germany .......................... 198 09 819

[51] Int. Cl.$^7$ ..................................................... H01Q 1/42
[52] U.S. Cl. .................. 343/789; 343/700 MS; 340/635
[58] Field of Search ............. 343/789, 700 MS, 343/709; 340/635, 644, 647; 324/536, 126; H01Q 1/42; G08B 21/00

[56] References Cited

U.S. PATENT DOCUMENTS

| | | | |
|---|---|---|---|
| 5,280,243 | 1/1994 | Miller | 324/303 |
| 5,477,231 | 12/1995 | Medard | 343/700 MS |
| 6,014,083 | 1/2000 | Bauerschmidt et al. | 340/635 |
| 6,020,821 | 2/2000 | Bauerschmidt et al. | 340/644 |

*Primary Examiner*—Hoanganh Le
*Attorney, Agent, or Firm*—Kenyon & Kenyon

[57] ABSTRACT

Sensors positioned in power transmission systems with tubular enclosures have radio interrogation capabilities. The radio antenna assigned to a sensor is a planar antenna with a radiating element and a conductive baseplate, with the radiating element being designed as a reed that is provided in a self-supporting manner in a recess in the baseplate and is short-circuited to the baseplate at one end. This forms a quarter-wave antenna which can be tuned by using a metal resonating member with a U-shaped cross-section and can be combined with a surface-wave sensor.

9 Claims, 2 Drawing Sheets

ENCLOSED POWER TRANSMISSION SYSTEM WITH A SENSOR POSITIONED WITHIN THE ENCLOSURE AND AN ANTENNA ASSIGNED TO THE SENSOR

FIELD OF THE INVENTION

The present invention relates to a type of electrical components, and can be used for the design of radio antennas that are used for transmitting measurement data within an enclosed power transmission system and are assigned to a sensor positioned within the enclosure, e.g., a surface wave sensor, in order to detect the temperature of the conductor, which is at a high-voltage potential.

BACKGROUND INFORMATION

In a conventional enclosed power transmission system, positioned inside the tubular enclosure is a first antenna element, which belongs to a control and monitoring system located outside the enclosure. This first antenna element communicates with a further antenna element located farther away within the system. The first and/or second antenna element can also communicate with sensors designed, for example, as surface wave sensors to each of which a transmitting and receiving means, for example a radio antenna, is assigned (See, e.g., International Patent Application No. 97/28587).

Another conventional method for detecting partial discharges in an enclosed, gas-insulated high-voltage system is to remove the electromagnetic waves produced as a result of partial discharges via a slot located in the enclosure, with the two conductors of a coaxial cable being connected directly to the side edges of this slot (See, e.g., European Patent No. 621 489, FIG. 10).

SUMMARY OF THE INVENTION

An object of the present invention is to design the radio antenna so that it meets the high-frequency and high-voltage requirements and can be easily integrated into the conductor and/or the enclosure.

According to the present invention, this object is achieved by the fact that the radio antenna includes a planar antenna with a radiating element and a conductive baseplate, with the radiating element being designed as a reed that is arranged in a self-supporting manner in a depression in the baseplate and is short-circuited to the baseplate at one end.

Radio antennas for interrogating sensors in enclosed power transmission systems suitably have an operating frequency of around 500 MHZ. In this frequency range, half-wave antennas are around 20 to 40 cm long, while quarter-wave antennas are around 10 to 20 cm long. In patch antennas, a strip-shaped, conductive layer is positioned several millimeters away from a conductive baseplate. The antenna designed according to the present invention is therefore a modified quarter-wave patch antenna which, when suitably dimensioned, has a resonant quality and a size designed for the space requirements of an enclosed power transmission system, with the antenna edges being rounded with sufficient curvature radii required for high-voltage applications. The antenna's low overall height allows it to be integrated into areas of the enclosure and/or conductor near the surface. In this type of antenna, for example, the base plate can be composed of a largely rectangular insert or mount in or on the enclosure or conductor. However, the baseplate provided with a depression is suitably formed by the conductor or the enclosure itself.

The radio antenna designed according to the present invention can also be constructed so that the resonant frequency of the resonator formed by the reed and baseplate can be varied. This may be accomplished by using a flat metal piece, bent in the shape of a U, that is positioned between the reed and baseplate, with the ends of the legs of the U-shaped flat metal piece pointing in the direction of the reed tip. Tuning to the desired resonant frequency can be accomplished by using removable U-shaped flat metal pieces, with the legs of the different flat metal pieces varying in length. Further fine tuning to the resonant frequency is possible if the position of the reed can be adjusted in the longitudinal direction within the depression in the baseplate, thus making it possible to set the width of the gap formed between the baseplate and reed at the tip of the reed.

The radio antenna according to the present invention has the further advantage that the sensor can be integrated into the antenna structure; in particular, it can be positioned between the radiating element and the conductive baseplate. In one embodiment of this arrangement, the sensor is positioned in a groove in the reed facing the baseplate.

DETAILED DESCRIPTION

Figure 1:
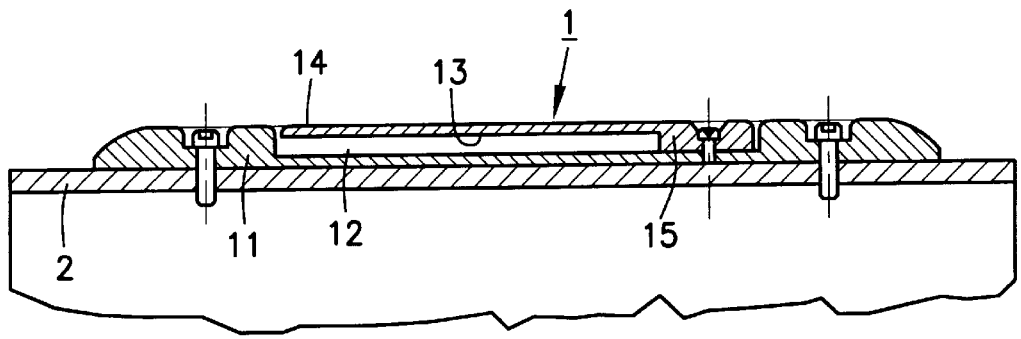
FIG. 1 shows a longitudinal view of a radio antenna mounted on an inner conductor of an enclosed power transmission system according to the present invention.
Figure 2:
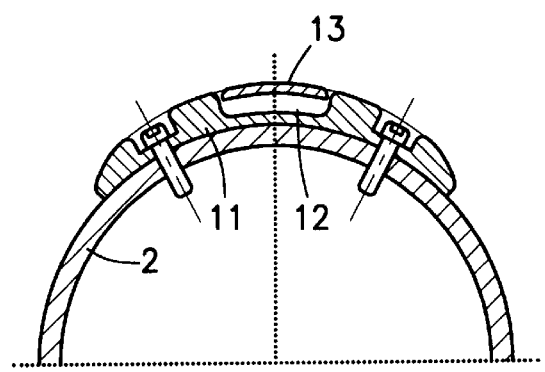
FIG. 2 shows a cross-sectional view of the radio antenna shown in FIG. 1.

As illustrated in FIGS. 1 and 2, a radio antenna 1, which is largely composed of a rectangular, frame-like baseplate 11 and radiating element 13, is mounted on inner conductor 2 of a gas-insulated, enclosed high-voltage system. Radiating element 13 has a rectangular reed 14 with a bracket 15 and is inserted into a trough-like, rectangular recess 12 so that its surface contour matches the surface contour of baseplate 11. Baseplate 11 and radiating element 13 are adjusted to fit the circumferential curvature of tubular inner conductor 2. Radiating element 13, whose active length corresponds to a quarter-wave length of the operating frequency, has dimensions of around 4×22 mm. The radial distance between the radiating element and the baseplate is approximately 10 mm. All edges of the radio antenna relevant for high-voltage applications are rounded accordingly.

Figure 3:
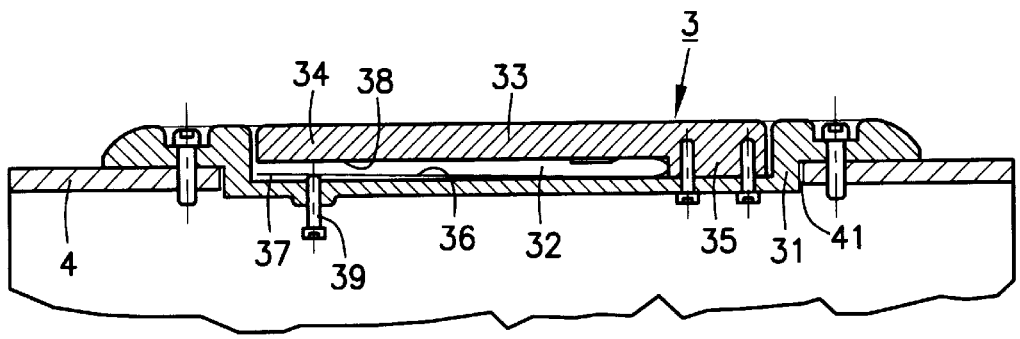
FIG. 3 shows a tunable radio antenna inserted in a recess in the inner conductor of an enclosed power transmission system according to he present invention.
Figure 4:
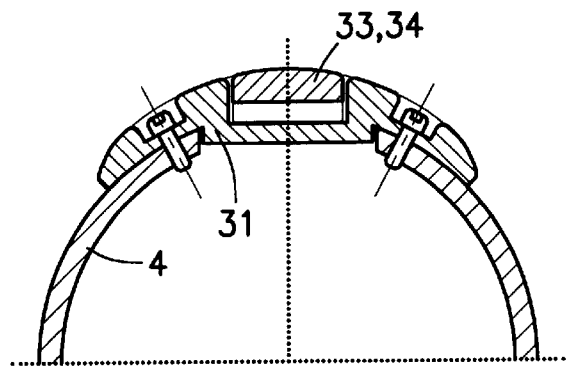
FIG. 4 shows another view of the tunable radio antenna shown in FIG. 3.

Radio antenna 3 illustrated in FIGS. 3 and 4 also includes a frame-like baseplate 31 and radiating element 33, which is in the shape of a reed 34 and is fastened to baseplate 31 by a bracket 35. In this case, the baseplate is inserted into a rectangular recess 41 in tubular inner conductor 4. A metal resonating member 36, designed with a U-shaped cross-section, is also inserted into hollow space 32 between reed 34 and baseplate 31, with the free ends of legs 37 and 38 ending in the region of the tip of reed 34. A tuning screw 39, which can be used to vary the distance between free legs 37 and 38, is also inserted into baseplate 31. This makes it possible to tune the resonant frequency of radio antenna 3. A sensor element 40, for example a surface-wave sensor, is also positioned in the hollow space between reed 34 and baseplate 31, close to bracket 35.

Figure 6:
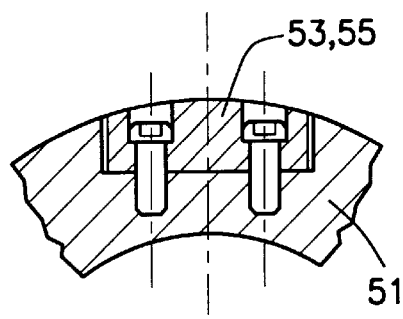
FIG. 6 shows another view of the tunable radio antenna shown in FIG. 5.
Figure 5:
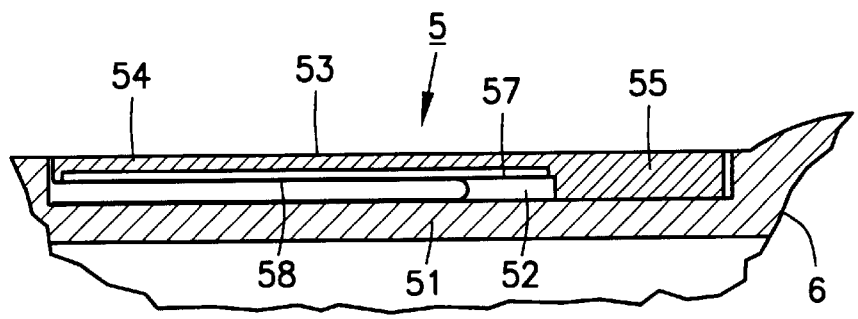
FIG. 5 shows a tunable radio antenna whose baseplate is formed by the conductor of an enclosed power transmission system that is provided with a depression and is at a high voltage according to the present invention.
Figure 7:
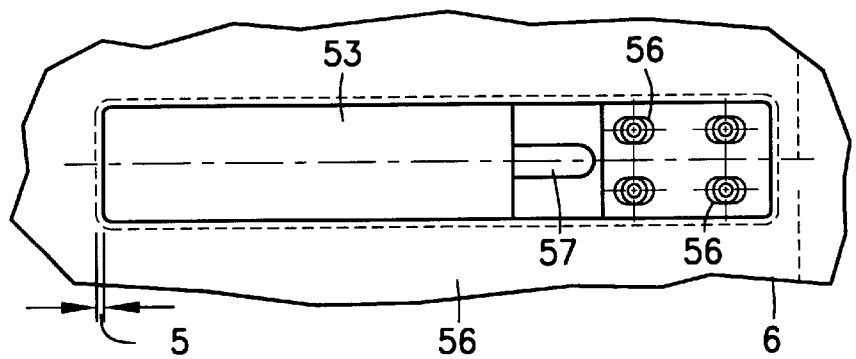
FIG. 7 shows yet another view of the tunable radio antenna shown in FIG. 5.

Radio antenna 5 illustrated in FIGS. 5 through 7 (FIG. 7 shows a view of the radiating element from below) is designed so that frame-like baseplate 51 is formed by tubular conductor 6; a recess 52 is provided for this purpose in the appropriate region of the conductor. Radiating element 53, in the form of a rectangular reed 54, with bracket 55 is inserted into this recess so that it is aligned with the conductor surface. A longitudinal groove 57, in which a surface-wave sensor can be inserted, is also provided in the inner surface of radiating element 53. In addition, a metal resonating member 58, designed in the shape of a U, is also provided here. This radio antenna can be adjusted to a given frequency, using metal resonating members 58 having different leg lengths. Fine tuning can be accomplished by designing attachment holes 56 in bracket 55 as slots so that radiating element 53 can slide in the longitudinal direction, thus making it possible to adjust gap s between the free end of reed 54 and the opposite wall of baseplate 51. The radio antenna illustrated in FIGS. 5 through 7 can be used, in particular, with conductor segments that are cast and are simultaneously used, for example, to support the tubular inner conductor of a gas-insulated, enclosed high voltage system against the outer enclosure, as proposed, for example, in German Patent Application No. 197 22 897.6.

What is claimed is:

1. A power transmission system, comprising:
   a tubular enclosure;
   a tubular conductor positioned within the tubular enclosure, the tubular conductor being set to a high voltage potential;
   at least one sensor provided on one of the tubular conductor and an inner wall of the tubular enclosure; and
   a radio antenna assigned to the at least one sensor, the radio antenna disposed on one of the tubular conductor and the inner wall of the tubular enclosure, the radio antenna including a planar antenna having a radiating element and a conductive baseplate, the radiating element including a reed and being positioned in a recess of the baseplate in a self-supporting manner, a bracket of the reed being connected to the baseplate to provide a short-circuit between the baseplate and the reed.

2. The power transmission system according to claim 1, wherein the baseplate includes one of a rectangular insert element and a mount, the baseplate being positioned one of in the tubular enclosure, on the tubular conductor and on the tubular enclosure.

3. The power transmission system according to claim 1, wherein the baseplate is formed by one of the tubular conductor and the tubular enclosure.

4. The power transmission system according to claim 1, further comprising:
   a resonator formed by the reed and the baseplate, the resonator having a variable resonant frequency.

5. The power transmission system according to claim 4, further comprising:
   a removable resonating member having a form of a U-shaped flat metal piece, the removable resonating member positioned between the reed and the baseplate.

6. The power transmission system according to claim 5, wherein the reed can be adjusted in a longitudinal direction.

7. The power transmission system according to claim 1, wherein the at least one sensor is positioned in a dielectric between the reed and the baseplate.

8. The power transmission system according to claim 7, wherein the reed has a groove for holding the at least one sensor, the groove facing the baseplate.

9. The power transmission system according to claim 1, wherein the reed is positioned parallel to a longitudinal axis of one of the tubular conductor and the tubular enclosure.

* * * * *